(12) United States Patent
Chen et al.

(10) Patent No.: US 10,757,438 B2
(45) Date of Patent: *Aug. 25, 2020

(54) MOTION ESTIMATION

(71) Applicant: Polycom, Inc., San Jose, CA (US)

(72) Inventors: Sean Chen, Beijing (CN); David Wang, Burnaby (CA)

(73) Assignee: Polycom, Inc., San Jose, CA (US)

( * ) Notice: Subject to any disclaimer, the term of this patent is extended or adjusted under 35 U.S.C. 154(b) by 443 days.

This patent is subject to a terminal disclaimer.

(21) Appl. No.: 15/463,387

(22) Filed: Mar. 20, 2017

(65) Prior Publication Data

US 2017/0195686 A1 Jul. 6, 2017

Related U.S. Application Data

(63) Continuation of application No. 14/498,010, filed on Sep. 26, 2014, now Pat. No. 9,628,793.

(51) Int. Cl.
*H04N 19/513* (2014.01)
*H04N 19/533* (2014.01)
*H04N 19/523* (2014.01)
*H04N 19/105* (2014.01)
*H04N 19/172* (2014.01)
*H04N 19/176* (2014.01)
*H04N 19/182* (2014.01)

(52) U.S. Cl.
CPC ......... *H04N 19/513* (2014.11); *H04N 19/105* (2014.11); *H04N 19/523* (2014.11); *H04N 19/533* (2014.11); *H04N 19/172* (2014.11); *H04N 19/176* (2014.11); *H04N 19/182* (2014.11)

(58) Field of Classification Search
CPC .. H04N 19/513; H04N 19/105; H04N 19/176; H04N 19/182; H04N 19/172
See application file for complete search history.

(56) References Cited

U.S. PATENT DOCUMENTS

| 8,761,261 B1* | 6/2014 | Wang | H04N 19/139 |
| | | | 375/240.16 |
| 9,628,793 B1* | 4/2017 | Chen | H04N 19/0063 |
| 2001/0028680 A1 | 10/2001 | Gobert | |
| 2003/0156646 A1* | 8/2003 | Hsu | H04N 19/593 |
| | | | 375/240.16 |

* cited by examiner

*Primary Examiner* — Tat C Chio
(74) *Attorney, Agent, or Firm* — Keith Lutsch, PC (57) ABSTRACT

A technique of motion estimation in video compression is described, the technique including: determining, in one or more reference frames of a video picture, the best full-pixel motion vector F for a block in a current frame of the video picture, wherein m and n are signed numbers and integer multiples of the distance between two adjacent full-pixels; selecting the best half-pixel motion vector candidates from a set of half-pixel motion vectors based on the best full-pixel motion vector; determining the best half-pixel motion vector H; selecting the best quarter-pixel motion vector candidates from a set of quarter-pixel motion vectors based on the best full-pixel motion vector and the best half-pixel motion vector; determining the best quarter-pixel motion vector Q; and determining the best motion vector for the block as BMV.

18 Claims, 5 Drawing Sheets

Figure 1

(Prior Art)

MOTION ESTIMATION

TECHNICAL FIELD

The disclosure relates to the field of video compression, and particularly to a method of motion estimation in video compression.

BACKGROUND ART

Hierarchy motion estimation is usually adopted by high quality video codec in video compression as it can give desirable Rate-Distortion quality in different kinds of motion scenarios, especially in fast motion situation. First, it gets accurate full-pixel motion vector. In this stage, down sampling is used to generate low resolution sample, where full-pixel motion estimation is made to find the best motion vector of multi pixels. Hence, based on this result, full-pixel motion estimation in certain region of input raw video can get precise full-pixel motion vector. In the second stage of sub-pixel motion estimation, sub pixel interpolation is required, which introduces heavy computational burden. For example, in H.264, half-pixel interpolation requires 6-tap filter, and quarter-pixel interpolation needs 2-tap filter; whereas in H.265, more computation is needed as 8-tap filter and 7-tap filter are required. Because of highly-expensive interpolation, sub-pixel motion estimation occupies a significant amount of computation, sometimes even more than that of full pixel motion estimation.

SUMMARY OF INVENTION

Therefore, how to efficiently reduce complexity of sub pixel motion estimation with little degradation of video quality becomes very important in motion estimation, especially for H.265 encoder.

According to the first aspect of the disclosure, there is provided a method of motion estimation in video compression, comprising:

determining, in one or more reference frames of a video picture, the best full-pixel motion vector F=(m,n) for a block in a current frame of the video picture, wherein m and n are signed numbers and integer multiples of the distance between two adjacent full-pixels;

selecting the best half-pixel motion vector candidates from a set of half-pixel motion vectors based on the best full-pixel motion vector;

determining the best half-pixel motion vector H;

selecting the best quarter-pixel motion vector candidates from a set of quarter-pixel motion vectors based on the best full-pixel motion vector and the best half-pixel motion vector;

determining the best quarter-pixel motion vector Q;

determining the best motion vector for the block as BMV=F+H+Q.

In most cases, at most four half-pixel vectors need to be checked when determining the best half-pixel motion vector, and at most three quarter-pixel vectors need to be checked when determining best quarter-pixel motion vector. Therefore, the number of sub-pixel vectors (including half-pixel vectors and quarter-pixel vectors) need to be checked is decreased significantly.

With this method, the sub-pixel motion vectors to be checked are strongly relevant to the motion trend of the block. When comparing with original sub pixel motion estimation, there is not over 1% loss of video quality, which can bring about 30%-35% reduction of sub pixel motion estimation complexity. Thus, the impact on video quality caused by this method is extremely little.

In an embodiment, the set of half-pixel motion vectors is S1={H1=(2u, 2u), H2=(0, 2u), H3=(−2u, 2u), H4=(−2u, 0), H5=(−2u, 0), H6=(2u, −2u), H7=(0,−2u), H8=(−2u, −2u)}; wherein the set of quarter-pixel motion vectors is S2={Q1=(u, u), Q2=(0, u), Q3=(−u, u), Q4=(u, 0), Q5=(−u, 0), Q6=(u, −u), Q7=(0, u), Q8=(−u, −u)}; and wherein u is a real number greater than zero, and 4u is the distance between two adjacent full-pixels.

The method further comprises: if the best full-pixel motion vector is a non-zero vector and m*n=0, the half-pixel motion vectors in the same and opposite directions of the best full-pixel motion vector are selected as the best half-pixel motion vector candidates.

The method further comprises: if the best full-pixel motion vector is a non-zero vector and m*n≠0, the half-pixel motion vectors in the same trend direction of the best full-pixel motion vector and the half-pixel motion vector in the opposite trend direction of the best full-pixel motion vector are selected as the best half-pixel motion vector candidates; wherein the half-pixel motion vectors in the same trend direction of the best full-pixel motion vector are $$\left(\frac{m}{|m|}2u, \frac{n}{|n|}2u\right), \left(\frac{m}{|m|}2u, 0\right), \text{ and } \left(0, \frac{n}{|n|}2u\right),$$

and the half-pixel motion vector in the opposite trend direction of the best full-pixel motion vector is $$\left(\frac{-m}{|m|}2u, \frac{-n}{|n|}2u\right),$$

and wherein each of the best half-pixel motion vector candidates belongs to S1.

In an embodiment, the method determines the one of the best half-pixel motion vector candidates, whose corresponding block best matches the block in the current frame, as the best half-pixel motion vector.

The method further comprises determining which of the block corresponding to the best full-pixel motion vector and the block corresponding to the best half-pixel motion vector better matches the block in the current frame.

The method further comprises: if the block corresponding to the best full-pixel motion vector better matches the block in the current frame and the best full-pixel motion vector is a zero vector, the quarter-pixel motion vector in the opposite direction of the best half-pixel motion vector is selected as the best quarter-pixel motion vector candidate.

The method further comprises: if the block corresponding to the best half-pixel motion vector better matches the block in the current frame, the quarter-pixel motion vectors in the same trend direction of the best half-pixel motion vector, each of which is at an angle less than 90 degrees with the best half-pixel motion vector, are selected as the best quarter-pixel motion vector candidates, wherein each of the best quarter-pixel motion vector candidates belongs to S2.

In an embodiment, the method determines the one of the best quarter-pixel motion vector candidates, whose corresponding block best matches the block in the current frame, as the best quarter-pixel motion vector.

According to the second aspect of the disclosure, there is provided a motion estimation system, comprising:

a first determination module adapted for determining, in one or more reference frames of the video picture, the best full-pixel motion vector F=(m,n) for a block in a current frame of a video picture, wherein m and n are signed real numbers;

a first selection module adapted for selecting the best half-pixel motion vector candidates from a set of half-pixel motion vectors based on the best full-pixel motion vector;

a second determination module adapted for determining the best half-pixel motion vector H;

a second selection module adapted for selecting the best quarter-pixel motion vector candidates from a set of quarter-pixel motion vectors based on the best full-pixel motion vector and the best half-pixel motion vector;

a third determination module adapted for determining the best quarter-pixel motion vector Q;

a fourth determination module adapted for determining the best motion vector for the block as BMV=F+H+Q.

According to the third aspect of the disclosure, there is provided one or more computer-readable media having computer-executable instructions embodied thereon that, when executed by at least one processor, cause at least one processor to perform any method mention above.

By means of the method, system or one or more computer-readable media provided herein, about 30%-35% of an amount of computation of the sub pixel motion estimation can be decreased, and meanwhile the impact on video quality is extremely little.

BRIEF DESCRIPTION OF DRAWINGS

These and other aspects are described in more detail with reference to the drawings. Therein.

DESCRIPTION OF EMBODIMENTS

Like reference symbols in the various drawings indicate like elements unless otherwise indicated.

It will be understood that, although the terms first, second, third etc. may be used herein to describe various elements, components, steps and/or modes, these elements, components, steps, and/or modes should not be limited by these terms. These terms are only used to distinguish one element, component, step, and/or mode from another element, component, step, and/or mode. Thus, a first element, component, step, and/or mode discussed below could be termed a second element, component, step, and/or mode without departing from the teachings of the present disclosure.

Figure 1:
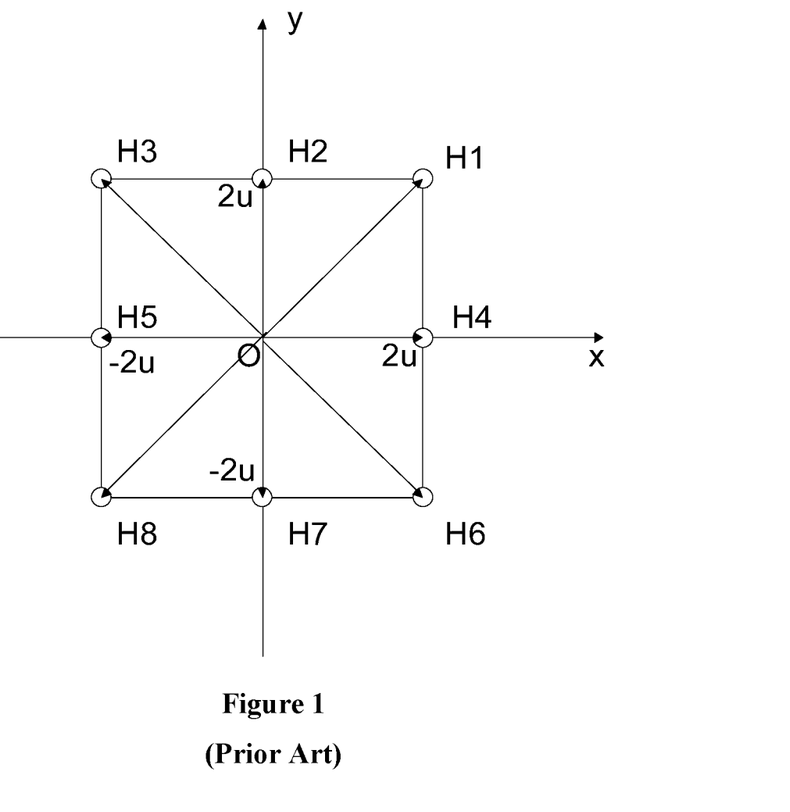
FIG. 1 shows a prior art method of motion estimation.

FIG. 1 shows an example of a prior art method of motion estimation. In this example, half-pixel motion estimation is implemented by checking eight half-pixel vectors (H1, H2, . . . H8) around the best full-pixel motion vector to find the best half-pixel motion vector with minimum SAD (the Sum of Absolute Difference) value. In FIG. 1, the symbol u is a real number greater than zero, and 4u is the distance between two adjacent full-pixels. Similarly, quarter-pixel motion estimation is implemented by checking eight quarter-pixel vectors around best half-pixel motion vectors to find the best quarter-pixel motion vector with minimum SAD value. However, checking eight vectors and SAD computation occupy a significant amount of computation.

Figure 2:
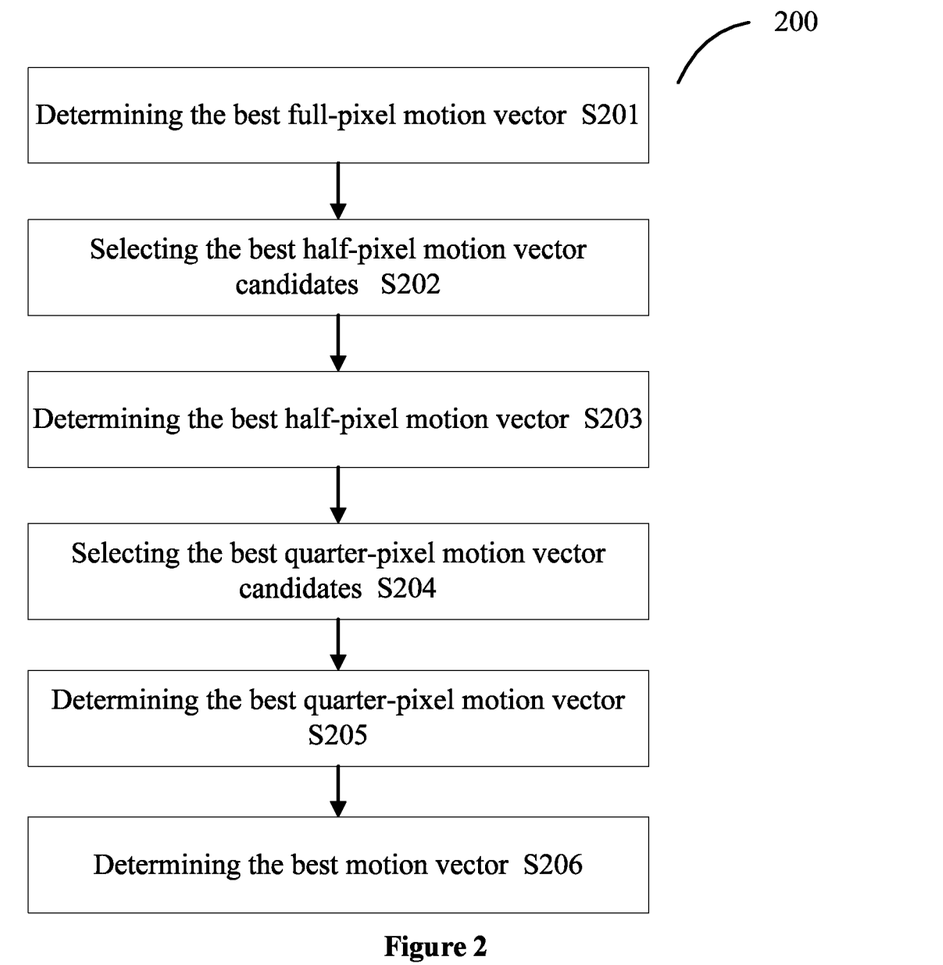
FIG. 2 shows a flow chart that describes steps in a method according to an embodiment of the disclosure.

FIG. 2 shows a flow chart that describes steps in a method 200 according to an embodiment of the disclosure. It should be appreciated that a video picture can be divided into a plurality of non-overlapping blocks. In step S201, the method 200 determines, in one or more reference frames of a video picture, the best full-pixel motion vector for a block in a current frame of the video picture. The best full-pixel motion vector may be the full-pixel motion vector whose corresponding block in its corresponding reference frame best matches the block in the current frame. This can be implemented by using any of the prior art techniques.

In step S202, the method selects the best half-pixel motion vector candidates from a set of half-pixel motion vectors based on the best full-pixel motion vector. The set of half-pixel motion vectors can be, for example, the eight half-pixel motion vectors (H1, H2 . . . , H8) shown in FIG. 1.

In step S203, the method determines the best half-pixel motion vector H. This can be achieved by, for example, determining the one of the best half-pixel motion vector candidates, whose corresponding block in the reference frame best matches the block in the current frame. The best quarter-pixel motion vector can be determined by employing SAD criteria, for example. Of course, other criteria can be employed, such as SATD (Sum of Absolute Transformed Difference), SSD (Sum of Squared Difference), MAD (Mean Absolute Difference), MSD (Mean Squared Difference), etc.

In step S204, the method selects the best quarter-pixel motion vector candidates from a set of quarter-pixel motion vectors based on the best full-pixel motion vector and the best half-pixel motion vector. The set of quarter-pixel motion vectors can be, for example, the eight half-pixel motion vectors (Q1, Q2 . . . , Q8) shown in FIG. 4A.

In step S205, the method determines the best quarter-pixel motion vector Q. This can be implemented by determining the one of the best quarter-pixel motion vector candidates, whose corresponding block in the reference frame best matches the block in the current frame. The best quarter-pixel motion vector can be determined by employing SAD criteria, for example. Of course, other criteria can be employed, such as SATD (Sum of Absolute Transformed Difference), SSD (Sum of Squared Difference), MAD (Mean Absolute Difference), MSD (Mean Squared Difference), etc. Then, the best motion vector for the block in the current frame can be determined as F+H+Q, in step S206.

Figure 3A:
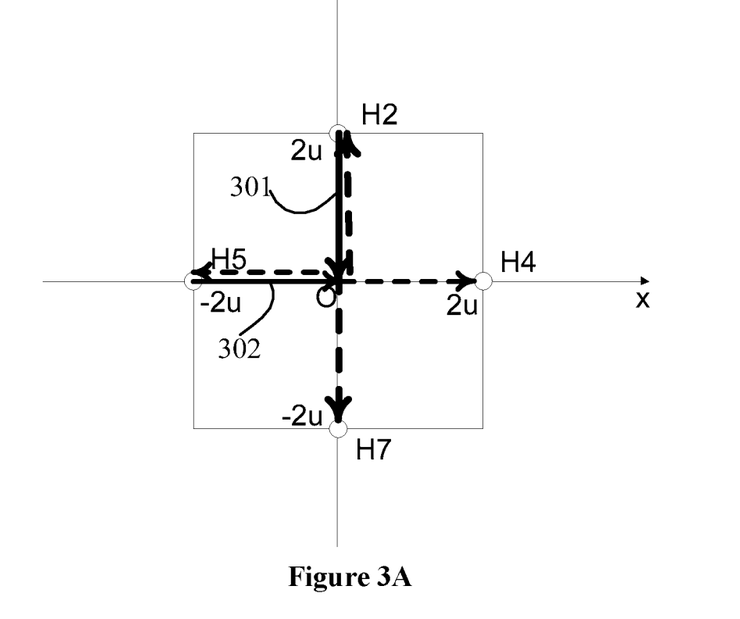
FIGS. 3A and 3B show aspects of a step for selecting the best half-pixel motion vector candidates.

FIG. 3A shows an aspect of a step for selecting the best half-pixel motion vector candidates. As an example, the full-pixel motion vector F=(m,n) was determined to be vertical or horizontal (i.e. F is a non-zero vector and m*n=0), wherein m and n are signed numbers and integer multiples of the distance between two adjacent full-pixels. In this case, the half-pixel motion vectors in the same and opposite directions of the best full-pixel motion vector are selected as the best half-pixel motion vector candidates. For example, if the best full-pixel motion vector (as indicated by the thickest black solid arrow 301) is vertical, then H2 and H7 are selected as the best half-pixel motion vector candidates, as indicated by the thickest black dashed arrows.

As another example, if the best full-pixel motion vector (as indicated by the thicker black solid arrow 302) is horizontal, then H4 and H5 are selected as the best half-pixel motion vector candidates, as indicated by the thicker black dashed arrows.

Figure 3B:
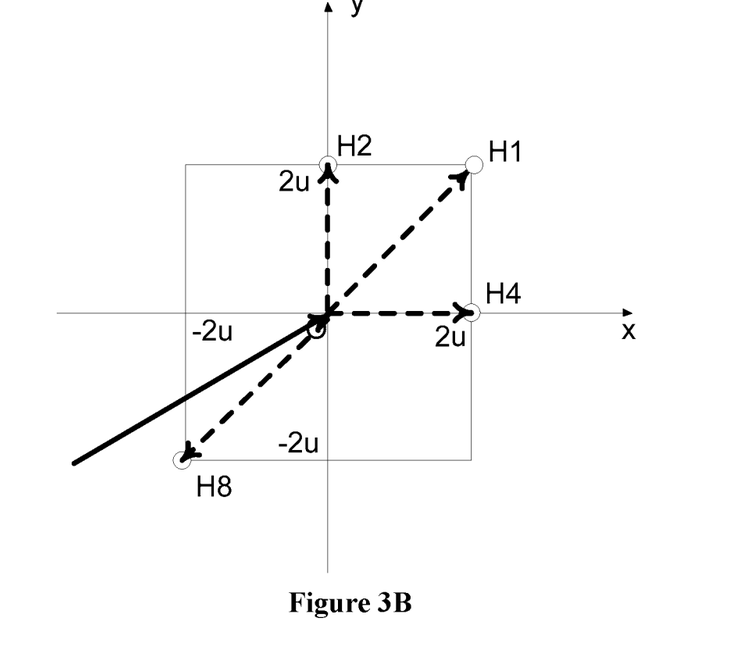

FIG. 3B shows another aspect of a step for selecting the best half-pixel motion vector candidates. As an example, the full-pixel motion vector F=(m,n) was determined to be a non-zero vector and m*n≠0. In this case, the half-pixel motion vectors in the same trend direction of the best full-pixel motion vector and the half-pixel motion vector in the opposite trend direction of the best full-pixel motion vector are selected as the best half-pixel motion vector candidates. For example, if the best full-pixel motion vector is the vector indicated by the black solid arrow, then the half-pixel motion vectors (H1, H2, H4) in the same trend direction of the best full-pixel motion vector and the half-pixel motion vector (H8) in the opposite trend direction of the best full-pixel motion vector are selected as the best half-pixel motion vector candidates, as indicated by the dashed arrows.

However, if the best full-pixel motion vector is a zero vector, eight half-pixel motion vectors (H1, H2 . . . , H8) are selected as the best half-pixel motion vector candidates, as indicated in FIG. 1.

Figure 4A:
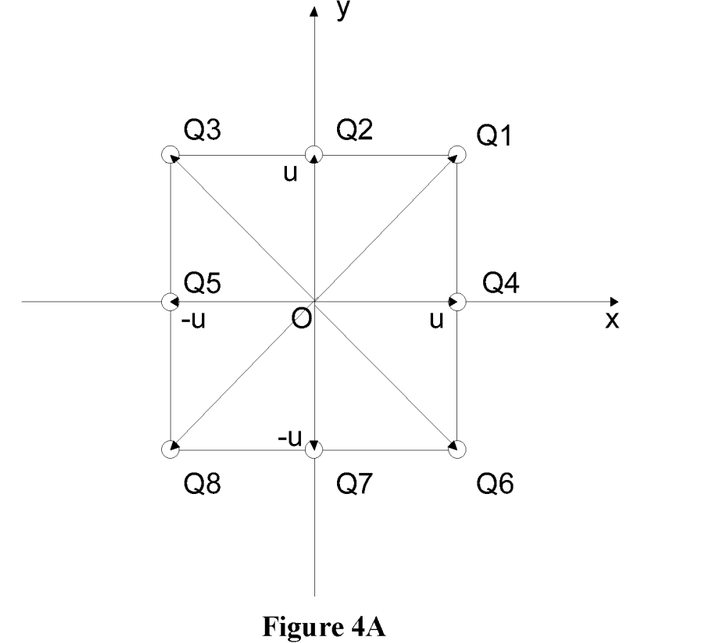
FIGS. 4A, 4B and 4C show aspects of a step for selecting the best quarter-pixel motion vector candidates.
Figure 4B:
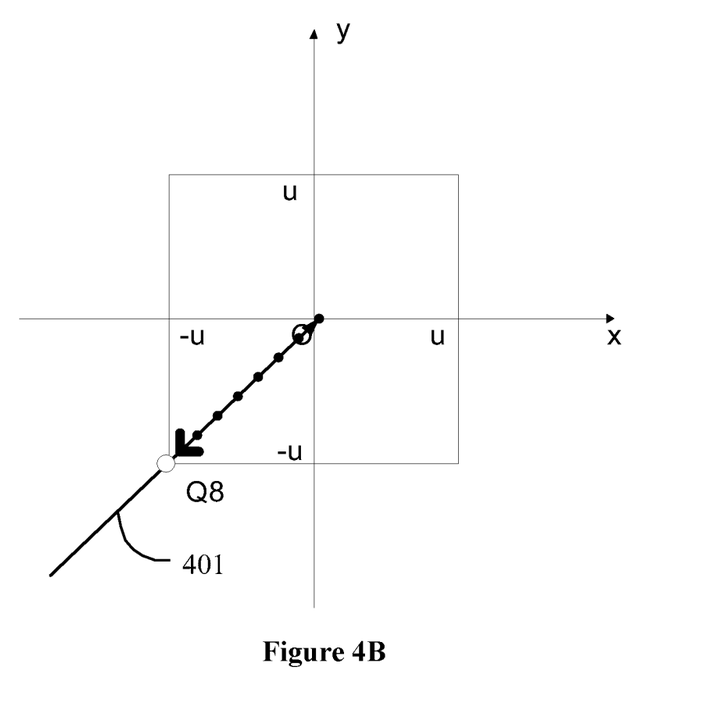
Figure 4C:
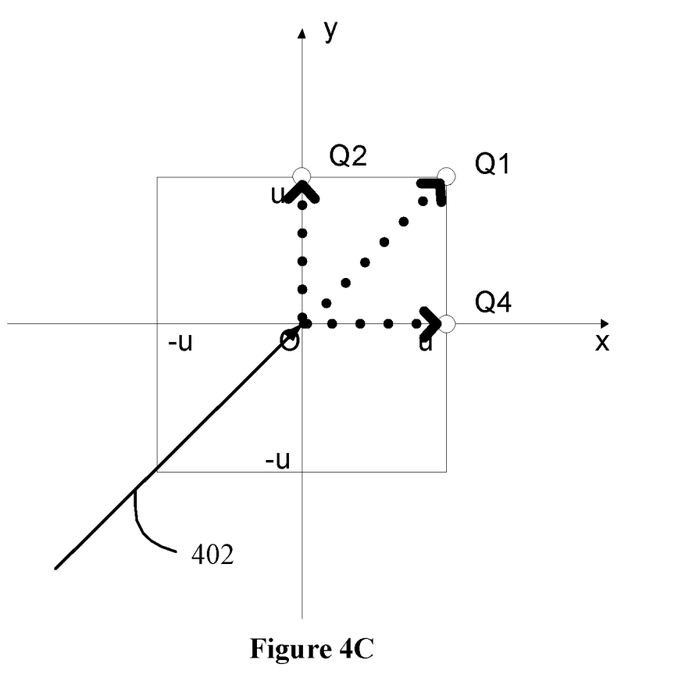

FIGS. 4A, 4B, and 4C show aspects of a step for selecting the best quarter-pixel motion vector candidates. Prior to selecting the best quarter-pixel motion vector candidates, it is determined that which of the block corresponding to the best full-pixel motion vector and the block corresponding to the best half-pixel motion vector better matches the block in the current frame. As shown in FIG. 4A, if the block corresponding to the best full-pixel motion vector better matches the block in the current frame and the best full-pixel motion vector is a non-zero vector, eight quarter-pixel vectors (Q1, Q2 . . . , Q8) are selected as the best quarter-pixel motion vector candidates.

In another aspect, if the block corresponding to the best full-pixel motion vector better matches the block in the current frame and the best full-pixel motion vector is a zero vector, the quarter-pixel motion vector in the opposite direction of the best half-pixel motion vector is selected as the best quarter-pixel motion vector candidate. As shown in FIG. 4B, if the block corresponding to the best full-pixel motion vector (not shown) better matches the block in the current frame and the best full-pixel motion vector is a zero vector, only one quarter-pixel motion vector Q8 in the opposite direction of the best half-pixel motion vector (for example, the best half-pixel motion vector H1, as indicated by thin solid arrow 401) is selected as the best quarter-pixel motion vector candidate.

In another aspect, if the block corresponding to the best half-pixel motion vector better matches the block in the current frame, the quarter-pixel motion vectors in the same trend direction of the best half-pixel motion vector, each of which is at an angle less than 90 degrees with the best half-pixel motion vector, are selected as the best quarter-pixel motion vector candidates. As shown in FIG. 4C, if the block corresponding to the best half-pixel motion vector (for example, the best half-pixel motion vector H1, as indicated by thin solid arrow 402 better matches the block in the current frame, the quarter-pixel motion vectors Q1, Q2 and Q4 in the same trend direction of the best half-pixel motion vector are selected as the best quarter-pixel motion vector candidates, as indicated by the thicker dotted arrows, each of which is at an angle less than 90 degrees with the best half-pixel motion vector.

Figure 5:
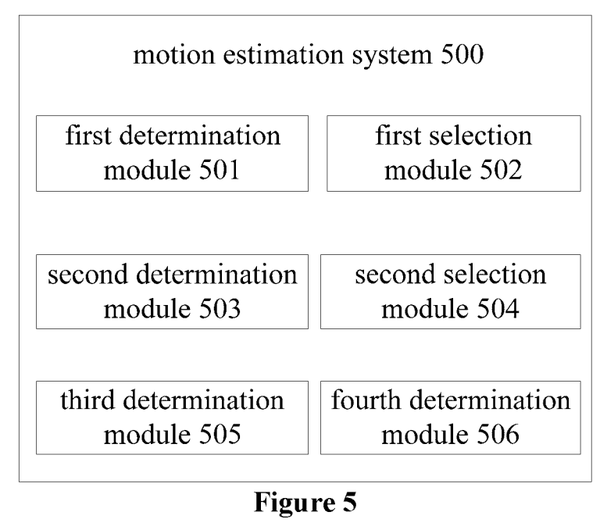
FIG. 5 shows a motion estimation system according to an embodiment of the disclosure.

FIG. 5 shows a motion estimation system 500 according to an embodiment of the disclosure. The motion estimation system comprises: a first determination module 501, which is adapted for determining, in one or more reference frames of the video picture, the best full-pixel motion vector F for a block in a current frame of a video picture; a first selection module 502, which is adapted for selecting the best half-pixel motion vector candidates from a set of half-pixel motion vectors based on the best full-pixel motion vector; a second determination module 503, which is adapted for determining the best half-pixel motion vector H; a second selection module 504, which is adapted for selecting the best quarter-pixel motion vector candidates from a set of quarter-pixel motion vectors based on the best full-pixel motion vector and the best half-pixel motion vector; a third determination module 505, which is adapted for determining the best quarter-pixel motion vector Q; a fourth determination module 506 which is adapted for determining the best motion vector for the block as BMV.

It should be noted that various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media. By way of example, and not limitation, computer-readable media may include hardware such as volatile and non-volatile, removable and non-removable media and/or storage devices implemented in a method or technology suitable for storage of information such as computer readable instructions, data structures, program modules, logic elements/circuits, or other data. Examples of computer-readable media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the various embodiments have been described in language specific to structural features and/or methodological acts, it is to be understood that the embodiments defined in the appended claims are not necessarily limited to the specific features or acts described. Rather, the specific features and acts are disclosed as example forms of implementing the various claimed embodiments.

What is claimed is:

1. A method of efficiently reducing complexity of sub pixel motion estimation in video compression for limiting degradation, comprising:

determining, in one or more reference frames of a video picture, a best full-pixel motion vector F for a block in a current frame of the video picture;

determining a best half-pixel motion vector H from a set of half-pixel motion vectors based on the best full-pixel motion vector;

determining a best quarter-pixel motion vector Q from a set of quarter-pixel motion vectors based on the best full-pixel motion vector and the best half-pixel motion vector;

determining the best motion vector for the block as BMV=F+H+Q; and determining full-pixel motion estimation based on the best motion vector.

2. The method of claim 1, wherein determining the best half-pixel motion vector H comprises:

selecting all of the set of half-pixel motion vectors as a set of best half-pixel motion vector candidates responsive to the best full-pixel motion vector F being a zero vector;

selecting the set of best half-pixel motion vector candidates comprising half-pixel motion vectors in a same and opposite directions of the best full-pixel motion vector, responsive to the best full-pixel motion vector being a non-zero vector along either an x or y axis;

selecting the set of best half-pixel motion vector candidates comprising half-pixel motion vectors in a same and opposite trend directions of the best full-pixel motion vector, responsive to the best full-pixel motion vector being a non-zero vector in a direction not along either an x or y axis; and selecting the best half-pixel motion vector from the set of best half-pixel motion vector candidates.

3. The method of claim 1, wherein determining the best half-pixel motion vector H comprises:

determining the half-pixel motion vector whose corresponding block best matches the block in the current frame.

4. The method of claim 1, wherein determining the best quarter-pixel motion vector Q comprises:

determining which of the block corresponding to the best full-pixel motion vector and the block corresponding to the best half-pixel motion vector better matches the block in the current frame.

5. The method of claim 4, wherein determining which of the block corresponding to the best full-pixel motion vector and the block corresponding to the best half-pixel motion vector better matches the block in the current frame comprises:

selecting the quarter-pixel motion vector in the opposite direction of the best half-pixel motion vector responsive to the block corresponding to the best full-pixel motion vector better matching the block in the current frame and responsive to the best full-pixel motion vector being a zero vector, and wherein selecting the best quarter-pixel motion vector candidates comprises:

selecting all of the set of quarter-pixel motion vectors as the best quarter-pixel motion vector candidates responsive to a determination that the block corresponding to the best full-pixel motion vector better matches the block in the current frame and the best full-pixel motion vector is a non-zero vector; and selecting the quarter-pixel motion vectors in the same trend direction of the best half-pixel motion vector, as the best quarter-pixel motion vector candidates, wherein each of the best quarter-pixel motion vector candidates belongs to the set of quarter-pixel motion vectors, responsive to a determination that the block corresponding to the best half-pixel motion vector better matches the block in the current frame.

6. The method of claim 1, wherein determining the best quarter-pixel motion vector comprises:

determining which of the set of quarter-pixel motion vectors has a corresponding block that best matches the block in the current frame.

7. A system of efficiently reducing complexity of sub pixel motion estimation for limiting degradation, comprising:

a first determination module adapted for determining, in one or more reference frames of the video picture, a best full-pixel motion vector F for a block in a current frame of a video picture;

a second determination module adapted for determining a best half-pixel motion vector H from a set of half-pixel motion vectors based on the best full-pixel motion vector;

a third determination module adapted for determining a best quarter-pixel motion vector Q from a set of quarter-pixel motion vectors based on the best full-pixel motion vector and the best half-pixel motion vector;

a fourth determination module adapted for determining the best motion vector for the block as BMV=F+H+Q; and a usage module adapted for determining full-pixel motion estimation based on the best motion vector.

8. The system of claim 7, wherein determining the best half-pixel motion vector H comprises:

selecting all of the set of half-pixel motion vectors as a set of best half-pixel motion vector candidates responsive to the best full-pixel motion vector F being a zero vector;

selecting the set of best half-pixel motion vector candidates comprising half-pixel motion vectors in a same and opposite directions of the best full-pixel motion vector, responsive to the best full-pixel motion vector being a non-zero vector along either an x or y axis;

selecting the set of best half-pixel motion vector candidates comprising half-pixel motion vectors in a same and opposite trend directions of the best full-pixel motion vector, responsive to the best full-pixel motion vector being a non-zero vector in a direction not along either an x or y axis; and selecting the best half-pixel motion vector from the set of best half-pixel motion vector candidates.

9. The system of claim 7, wherein determining the best half-pixel motion vector H comprises:

determining the half-pixel motion vector whose corresponding block best matches the block in the current frame.

10. The system of claim 7, wherein determining the best quarter-pixel motion vector Q comprises:

determining which of the block corresponding to the best full-pixel motion vector and the block corresponding to the best half-pixel motion vector better matches the block in the current frame.

11. The system of claim 10, wherein determining which of the block corresponding to the best full-pixel motion vector and the block corresponding to the best half-pixel motion vector better matches the block in the current frame comprises:

selecting the quarter-pixel motion vector in the opposite direction of the best half-pixel motion vector responsive to the block corresponding to the best full-pixel motion vector better matching the block in the current frame and responsive to the best full-pixel motion vector being a zero vector, and wherein selecting the best quarter-pixel motion vector candidates comprises:
selecting all of the set of quarter-pixel motion vectors as the best quarter-pixel motion vector candidates responsive to a determination that the block corresponding to the best full-pixel motion vector better matches the block in the current frame and the best full-pixel motion vector is a non-zero vector; and
selecting the quarter-pixel motion vectors in the same trend direction of the best half-pixel motion vector, as the best quarter-pixel motion vector candidates, wherein each of the best quarter-pixel motion vector candidates belongs to the set of quarter-pixel motion vectors, responsive to a determination that the block corresponding to the best half-pixel motion vector better matches the block in the current frame.

12. The system of claim 7, wherein determining the best quarter-pixel motion vector comprises:
determining which of the set of quarter-pixel motion vectors has a corresponding block that best matches the block in the current frame.

13. One or more non-transitory machine-readable media on which are stored instructions for efficiently reducing complexity of sub pixel motion estimation, comprising instructions that when executed cause a machine to:
determine, in one or more reference frames of a video picture, a best full-pixel motion vector F for a block in a current frame of the video picture;
determine a best half-pixel motion vector H from a set of half-pixel motion vectors based on the best full-pixel motion vector;
determine a best quarter-pixel motion vector Q from a set of quarter-pixel motion vectors based on the best full-pixel motion vector and the best half-pixel motion vector;
determine the best motion vector for the block as BMV=F+H+Q; and
determine full-pixel motion estimation based on the best motion vector.

14. The one or more machine-readable media of claim 13, wherein the instructions that when executed cause the machine to determine the best half-pixel motion vector H comprise instructions that when executed cause the machine to:
select all of the set of half-pixel motion vectors as a set of best half-pixel motion vector candidates responsive to the best full-pixel motion vector F being a zero vector;
select the set of best half-pixel motion vector candidates comprising half-pixel motion vectors in a same and opposite directions of the best full-pixel motion vector, responsive to the best full-pixel motion vector being a non-zero vector along either an x or y axis;
select a set of best half-pixel motion vector candidates comprising half-pixel motion vectors in a same and opposite trend directions of the best full-pixel motion vector, responsive to the best full-pixel motion vector being a non-zero vector in a direction not along either an x or y axis; and
select the best half-pixel motion vector from the set of best half-pixel motion vector candidates.

15. The one or more machine-readable media of claim 13, wherein the instructions that when executed cause the machine to determine the best half-pixel motion vector H comprise instructions that when executed cause the machine to:
determine the half-pixel motion vector whose corresponding block best matches the block in the current frame.

16. The one or more machine-readable media of claim 13, wherein the instructions that when executed cause the machine to determine the best quarter-pixel motion vector Q comprise instructions that when executed cause the machine to:
determine which of the block corresponding to the best full-pixel motion vector and the block corresponding to the best half-pixel motion vector better matches the block in the current frame.

17. The one or more machine-readable media of claim 16, wherein the instructions that when executed cause the machine to determine which of the block corresponding to the best full-pixel motion vector and the block corresponding to the best half-pixel motion vector better matches the block in the current frame comprise instructions that when executed cause the machine to:
select the quarter-pixel motion vector in the opposite direction of the best half-pixel motion vector responsive to the block corresponding to the best full-pixel motion vector better matching the block in the current frame and responsive to the best full-pixel motion vector being a zero vector, and
wherein the instructions that when executed cause the machine to select the best quarter-pixel motion vector candidates comprise instructions that when executed cause the machine to:
select all of the set of quarter-pixel motion vectors as the best quarter-pixel motion vector candidates responsive to a determination that the block corresponding to the best full-pixel motion vector better matches the block in the current frame and the best full-pixel motion vector is a non-zero vector; and
select the quarter-pixel motion vectors in the same trend direction of the best half-pixel motion vector, as the best quarter-pixel motion vector candidates, wherein each of the best quarter-pixel motion vector candidates belongs to the set of quarter-pixel motion vectors, responsive to a determination that the block corresponding to the best half-pixel motion vector better matches the block in the current frame.

18. The one or more machine-readable media of claim 13, wherein the instructions that when executed cause the machine to determine the best quarter-pixel motion vector comprise instructions that when executed cause the machine to:
determine which of the set of quarter-pixel motion vectors has a corresponding block that best matches the block in the current frame.

\* \* \* \* \*